(12) United States Patent
Lehmann et al.

(10) Patent No.: US 10,108,789 B2
(45) Date of Patent: Oct. 23, 2018

(54) INCREASING SECURITY OF A DEVICE AND/OR SYSTEM VIA QUESTIONING ABOUT A CHARACTERISTIC OF THE DEVICE AND/OR SYSTEM

(71) Applicant: International Business Machines Corporation, Armonk, NY (US)

(72) Inventors: Stefan Lehmann, Tucson, AZ (US); Khanh V. Ngo, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 7 days.

(21) Appl. No.: 15/399,607

(22) Filed: Jan. 5, 2017

(65) Prior Publication Data

US 2017/0116398 A1    Apr. 27, 2017

Related U.S. Application Data

(63) Continuation of application No. 14/275,729, filed on May 12, 2014, now Pat. No. 9,563,758.

(51) Int. Cl.
*H04L 29/06*  (2006.01)
*G06F 21/31*  (2013.01)
*G06F 21/60*  (2013.01)

(52) U.S. Cl.
CPC ............ *G06F 21/31* (2013.01); *G06F 21/604* (2013.01); *G06F 2221/2133* (2013.01)

(58) Field of Classification Search
CPC ..... H04L 63/08; H04L 63/0861; H04L 63/10; H04L 63/101; H04L 63/102; G06F 21/31; G06F 21/44

USPC .......... 726/1–7, 17–19, 27–30; 713/168, 193
See application file for complete search history.

(56) References Cited

U.S. PATENT DOCUMENTS

| | | | | |
|---|---|---|---|---|
| 6,327,659 B2* | 12/2001 | Boroditsky | ............. | G06F 21/31 380/258 |
| 7,302,570 B2* | 11/2007 | Beard | ..................... | G06F 21/33 713/155 |
| 7,743,409 B2 | 6/2010 | Gonzalez et al. | | |
| 7,844,546 B2 | 11/2010 | Fleishman et al. | | |
| 8,037,295 B2 | 10/2011 | Lin | | |
| 8,200,773 B2* | 6/2012 | Bluestone | ............... | G06F 21/53 709/217 |

(Continued)

FOREIGN PATENT DOCUMENTS

| | | |
|---|---|---|
| TW | 201020937 A | 6/2010 |
| WO | 2007006921 A1 | 1/2007 |

OTHER PUBLICATIONS

Lehmann et al., U.S. Appl. No. 14/275,729, filed May 12, 2014.

(Continued)

*Primary Examiner* — Hosuk Song
(74) *Attorney, Agent, or Firm* — Zilka-Kotab, P.C.

(57) ABSTRACT

A method for preventing unauthorized access to and/or modification of a page of a device and/or system according to one embodiment includes presenting a question via a graphical user interface; receiving a response to the question; allowing access to and/or modification of the page when the response to the question includes the answer; and not allowing access to and/or modification of the page when the response to the question does not include the answer. An answer to the question includes a characteristic of the device and/or system.

18 Claims, 4 Drawing Sheets

(56) References Cited

U.S. PATENT DOCUMENTS

| | | | |
|---|---|---|---|
| 8,239,677 B2 * | 8/2012 | Colson | G06F 21/34 |
| | | | 705/51 |
| 8,365,260 B2 * | 1/2013 | Gabriel | G06F 21/36 |
| | | | 713/182 |
| 8,370,926 B1 | 2/2013 | Satish | |
| 8,387,122 B2 | 2/2013 | Toomim et al. | |
| 8,392,978 B2 | 3/2013 | Grove et al. | |
| 8,793,777 B2 | 7/2014 | Colson | |
| 8,904,506 B1 | 12/2014 | Canavor et al. | |
| 8,984,607 B1 * | 3/2015 | Hughes | G06F 21/31 |
| | | | 726/28 |
| 9,563,758 B2 | 2/2017 | Lehmann et al. | |
| 2009/0327131 A1 * | 12/2009 | Beenau | G06Q 20/32 |
| | | | 705/44 |
| 2013/0160098 A1 | 6/2013 | Carlson et al. | |
| 2014/0298444 A1 | 10/2014 | Iwamatsu et al. | |
| 2015/0324561 A1 | 11/2015 | Lehmann et al. | |

OTHER PUBLICATIONS

Non-Final Office Action from U.S. Appl. No. 14/275,729, dated Nov. 19, 2015.
Non-Final Office Action from U.S. Appl. No. 14/275,729, dated Jun. 3, 2016.
Notice of Allowance from U.S. Appl. No. 14/275,729, dated Sep. 27, 2016.

* cited by examiner

INCREASING SECURITY OF A DEVICE AND/OR SYSTEM VIA QUESTIONING ABOUT A CHARACTERISTIC OF THE DEVICE AND/OR SYSTEM

BACKGROUND

The present invention relates to system security, and more specifically, this invention relates to preventing unauthorized access to and/or modification of a page of a device and/or system.

Some network security audits/scans use automated scripts, agents, etc. such as "spiders" to perform various tasks to probe the security of the system. For example, some spiders may try to post to web forms, such as attempting to fill out fields within the forms. On tape storage products as well as web based products in general, posting to some of these web forms may cause problems and disruptions. For example, the spider could post to a form that modifies configuration settings of a storage product coupled to the system being probed.

Spiders are also commonly programmed to traverse a website and select (e.g., click) on all user input options they come across, making it desirable to protect network resets and sensitive areas with password and/or security measures. However, these networks often have multiple authorized users, making user-specific passwords not a viable option.

BRIEF SUMMARY

A method for preventing unauthorized access to and/or modification of a page of a device and/or system includes presenting a question via a graphical user interface; receiving a response to the question; allowing access to and/or modification of the page when the response to the question includes the answer; and not allowing access to and/or modification of the page in response to determining that the response to the question does not include the answer. An answer to the question includes a characteristic of the device and/or system.

A computer program product for preventing unauthorized access to and/or modification of a page of a device and/or system, according to one embodiment, includes a computer readable storage medium having program code embodied therewith, the program code readable and/or executable by a device to cause the device to: present a question via a graphical user interface; receive a response to the question; allow access to and/or modification of the page in response to determining that the response to the question includes the answer; and not allow access to and/or modification of the page in response to determining that the response to the question does not include the answer. An answer to the question includes a characteristic of the device and/or system.

A system according to one embodiment includes a processor and logic integrated with and/or executable by the processor. The logic is configured to present a question via a graphical user interface, receive a response to the question; allow access to and/or modification of the page in response to determining that the response to the question includes the answer; and not allow access to and/or modification of the page in response to determining that the response to the question does not include the answer. An answer to the question includes a characteristic of the device and/or system.

Other aspects and embodiments of the present invention will become apparent from the following detailed description, which, when taken in conjunction with the drawings, illustrate by way of example the principles of the invention.

DETAILED DESCRIPTION

Figure 1:
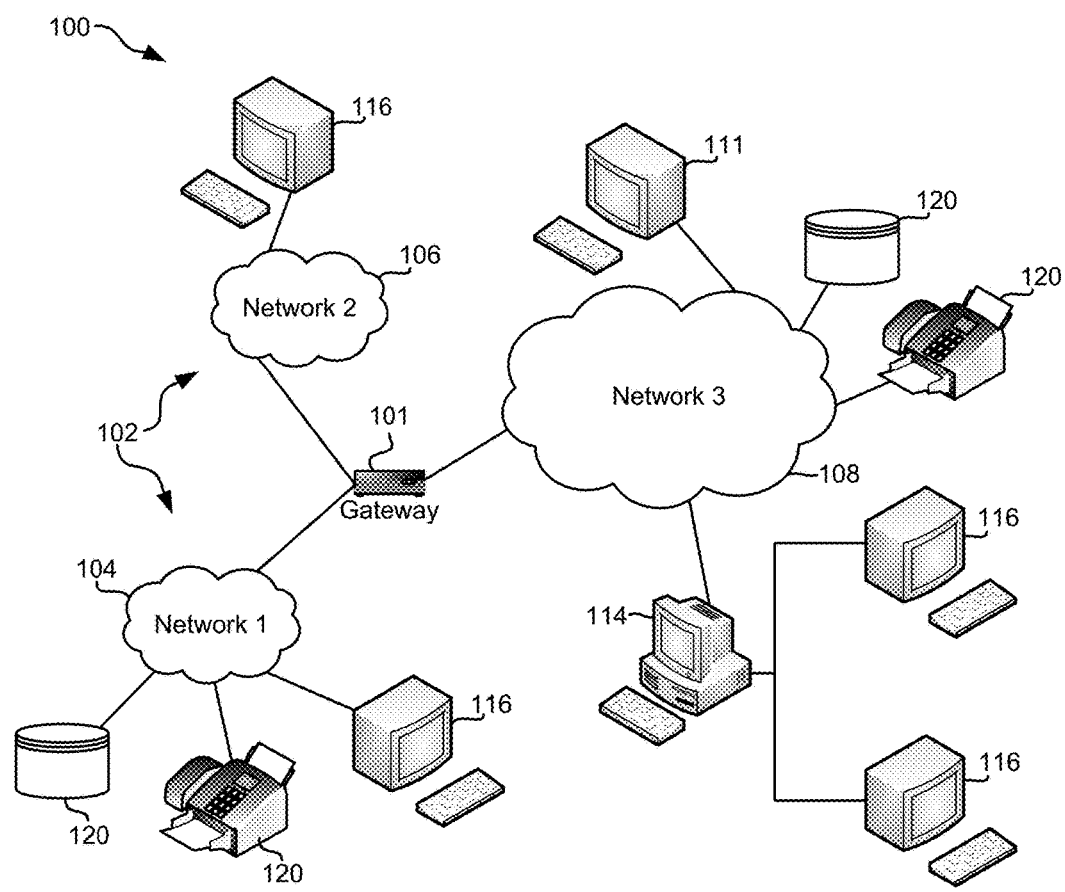
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for preventing unauthorized access to and/or modification of a page of a device and/or system by computerized automations, while readily enabling access by users of the system.

In one general embodiment, a method for preventing unauthorized access to and/or modification of a page of a device and/or system includes presenting a question via a graphical user interface; receiving a response to the question; allowing access to and/or modification of the page when the response to the question includes the answer; and not allowing access to and/or modification of the page when the response to the question does not include the answer. An answer to the question includes a characteristic of the device and/or system.

In another general embodiment, a computer program product for preventing unauthorized access to and/or modification of a page of a device and/or system includes a computer readable storage medium having program code embodied therewith, the program code readable and/or executable by a device to cause the device to: present a question via a graphical user interface; receive a response to the question; allow access to and/or modification of the page when the response to the question includes the answer; and not allow access to and/or modification of the page when the response to the question does not include the answer. An answer to the question includes a characteristic of the device and/or system.

In yet another general embodiment, a system includes a processor and logic integrated with and/or executable by the processor. The logic is configured to present a question via a graphical user interface, receive a response to the question; allow access to and/or modification of the page when the response to the question includes the answer; and not allow access to and/or modification of the page when the response to the question does not include the answer. An answer to the question includes a characteristic of the device and/or system.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
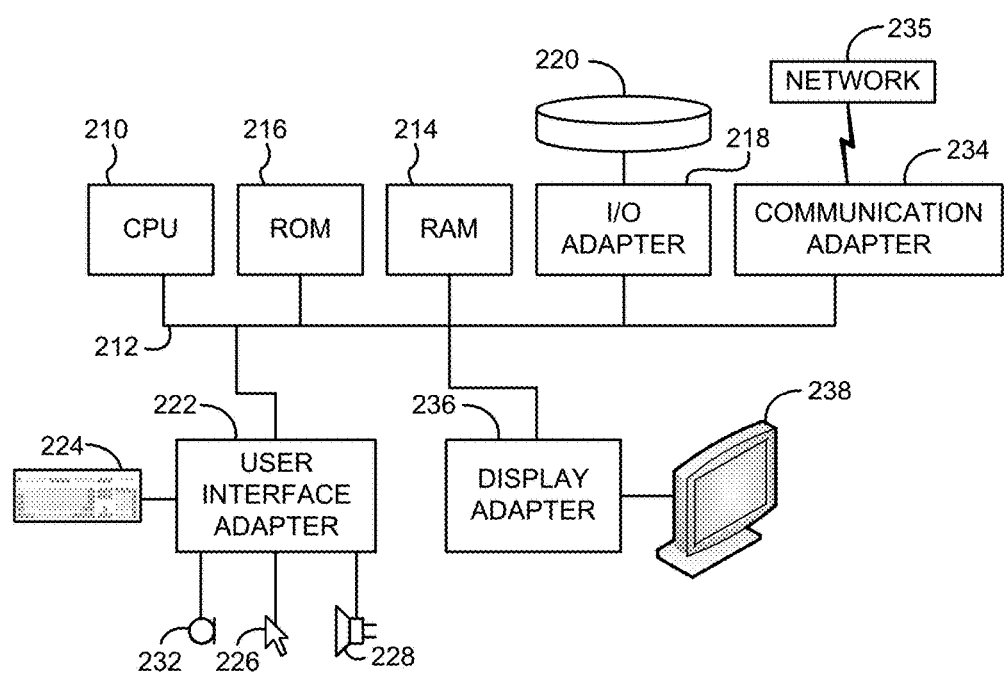
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

As noted above, computerized automations such as spider programs are commonly programmed to probe the security of a system and/or device. In storage hardware environments (as described above), protected networks, system configuration pages, reset pages, etc. computerized automations particularly pose potential threats. For example, a spider might reach a system configuration reset page and inadvertently reset the configuration of some component of the system. This in turn could result in system downtime, labor expenses to reconfigure the component, etc. Blocking access to pages altogether is not a viable option, as an authorized user may need to have access to the page to perform tasks such as modifying system configurations, etc. Accordingly, various embodiments enable user access, but effectively block access by automations such as spiders.

Several potential solutions were contemplated by the inventors to alleviate the foregoing issues. For example, a storage product asking for a confirmation dialog was considered, however this is not sufficient as today's smart spiders would be able to post/click the confirm box and continue. Furthermore, visual challenges that asked for an answer, known as "captchas" were considered; however they are minimally secure to unauthorized human users as any human can easily answer them. Security questions similar to bank security measures were also contemplated, however they fail to provide a non-user specific security interface and are therefore not desirable. Furthermore, an additional username/password dialog was considered; however a web crawler or spider may have already uncovered and used a system username/password to get to the point where it would be asked for an additional username/password, which it might be able to reuse.

Various approaches described herein utilize a question and answer technique that uses system-specific questions that are answerable by a human user but not readily answerable by an automation. The idea of presenting a user attempting to gain access to a device and/or system with system characteristic questions is a viable solution because it is a non-user-specific security option that a web crawler or spider will not be able to answer.

Implementing questions in devices and/or systems as described in the various embodiments herein desirably provides protection from unwanted input. It follows that, in preferred embodiments, a question may be presented, e.g., to a user attempting to provide input to the device and/or system, particularly prior to presenting the user access to initiate device and/or system resets, view and/or amend protected documents, erase data, etc. As a result, said preferred embodiments may protect the device and/or system from unwarranted and/or damaging inputs from unauthorized users, e.g., those users who are not be able to correctly answer such presented questions as will be described in further detail below.

Figure 3:
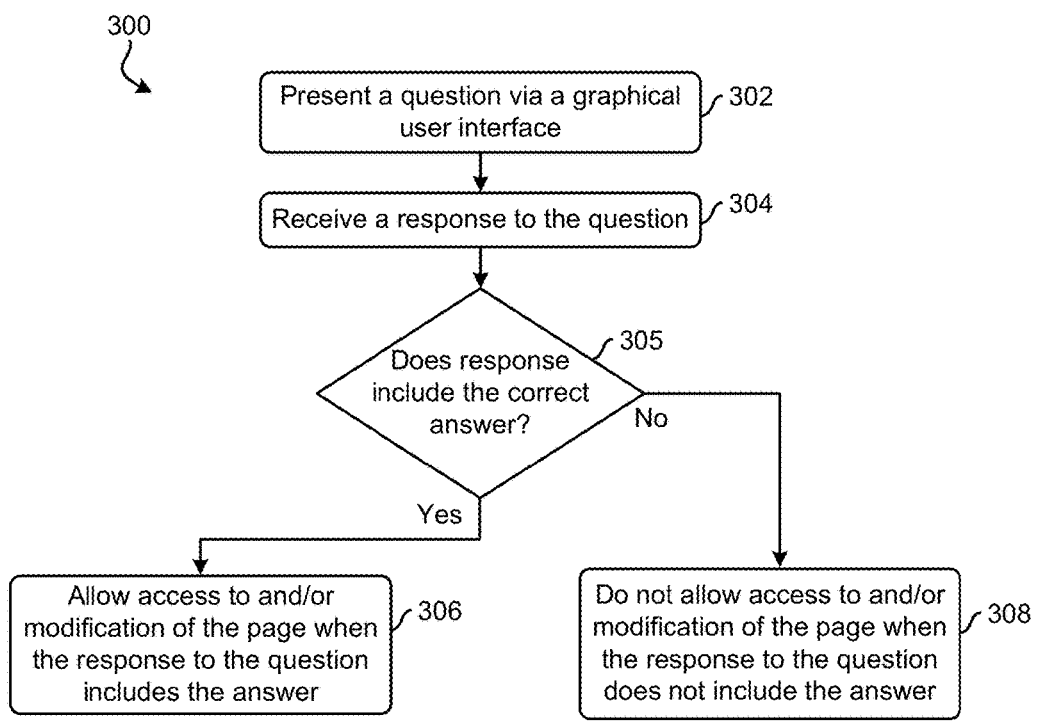
FIG. 3 illustrates a flowchart of a method according to one embodiment.

FIG. 3 depicts a flowchart of a method 300, in accordance with one embodiment. As an option, the present method flowchart 300 may be implemented in conjunction with features from any other embodiment listed herein, such as those described with reference to the other FIGS. Of course, however, such method flowchart 300 and others presented herein may be used in various applications and/or in permutations which may or may not be specifically described in the illustrative embodiments listed herein. Further, the method flowchart 300 presented herein may be used in any desired environment. Thus FIG. 3 (and the other FIGS.) should be deemed to include any and all possible permutations.

Referring now to FIG. 3, the flowchart of method 300 includes a method for preventing unauthorized access to and/or modification of a page of a device and/or system. For embodiments corresponding to preventing unauthorized access to and/or modification of a page of a system, the system may include a data storage system. However, in various other approaches, a system as referred to herein may include any other type of system, e.g., with discernible information, depending on the desired embodiment.

In preferred approaches, one or more of the steps of method 300 may be performed to prevent unauthorized access to and/or modification of pages having increased security settings, also referred to herein as an "authorized access page". It follows that authorized access pages may include sensitive settings for a device and/or system corresponding thereto. Unauthorized access attempts may be performed by a robot, unauthorized user, program code (e.g., web crawler, spider program, smart spider program, etc.), etc. Furthermore, any one or more of the steps of method 300 may be performed during a security audit.

It should also be noted that any one or more of the operations of method 300 may be performed by a processor, e.g., see 210 of FIG. 2. Moreover, in other approaches, any one or more of the operations of method 300 may be performed by executing software stored on a computer program product as described herein.

With continued reference to FIG. 3, method step 302 presents a question via a graphical user interface (GUI). The presented question may be generated in response to an access and/or modification request for the page of a device and/or system. A "page" may be any collection of data about the device and/or system to be output on the GUI. Illustrative pages include configuration pages, reset pages, purely informational pages, or any other type of output as would be understood by one skilled in the art upon reading the present disclosure.

Depending on what or who generated the access and/or modification request, the question may be presented via different mediums. For example, if a modification request is generated by a user, a question may be presented to the user via a GUI as described in operation 302. However, if a modification request is generated by program code, a question may be presented to the program code source via program code. It is also preferred that the presented question includes a characteristic of the device and/or system, but is not limited thereto. Examples of illustrative questions and answers pertinent to such a storage system are presented elsewhere herein.

Looking to operation 304, a response to the question is received. The response received is preferably used to determine if access to and/or modification of a page of the device and/or system will be granted. For example, if the response to the question presented in operation 302 is determined to be an incorrect response, method 300 may deny access to and/or modification of the page. Thus, method 300 may further include an optional operation 305 which determines whether the response to the question presented in operation 302 includes the answer (e.g., correct response).

The method 300 proceeds by allowing access to and/or modification of the page when the response to the question includes the correct answer, as shown in operation 306. However, access to and/or modification of the page is not allowed when the response to the question does not include the answer, as shown in operation 308. Furthermore, it should be noted that "Yes" and "No" according to the present embodiment of FIG. 3 are presented by way of example only and are in no way intended to limit the invention. "Yes" and "No" are intended to represent a logical state that may be represented by any other form, e.g., logical values "1" and "0".

As described above, access may be granted to an authorized access page upon receiving an answer (also referred to herein as a "correct response") to a presented question. Moreover, in preferred approaches, the presented question includes a characteristic of the device and/or system. In various embodiments, the characteristic of the device and/or system may include one or more physical characteristics of the device and/or system, e.g., the name of a particular media library, the number of media drives in a device and/or system, the number listed on a particular frame of a device and/or system, etc., and/or combinations of such characteristics.

The question is preferably administered by a computing device managing the authorized access page. In other words, upon receiving a request to access and/or modify an authorized access page, the computing device may select and present a question via a GUI.

In various embodiments described herein, one or more of the steps of method 300 may be implemented in response to a request to access and/or modify an authorized access page that is received from a user. It follows that, according to in-use embodiments, a potential user may request access to an authorized access page whereupon step 302 of FIG. 3 may be performed in conjunction with a GUI accessible to the user. The questions may be presented to the user in any desired manner, such as fill-in the blank, select one of the following, enter a numeric value, text input, etc. question formats. Additionally, in some approaches, presented questions and/or corresponding answer(s) may be predefined, e.g., stored in a data table in the system.

In other approaches, presented questions and/or corresponding answer(s) may be generated during use. For example, a system has knowledge of its configuration, but a spider does not. Thus, the system can select a characteristic of some component thereof using some technique, e.g., selection from a pool of predefined characteristics according to a predefined sequence, random selection of a characteristic, etc. and present a question regarding that component, e.g., asking what the serial number of a particular tape drive is. The user can find the physical drive, view the number on the drive, and enter the serial number. A spider would not be able to do so.

According to some embodiments, modifying an authorized access page may include providing input to a field on the authorized access page. In some approaches, modification of a field on the authorized access page may be permitted while the page is being output. In other words, a question may be presented on the "back-end" of an authorized access page. Thus, an authorized access page may allow for modification thereof before presenting a question as seen in step 302 of FIG. 3. Furthermore, the authorized access page may process the modifications upon receiving a correct answer to the presented question. However, if an incorrect answer is received in response to the presented question, the modifications of one or more fields of the authorized access page may be rejected. Moreover, upon rejecting the modifications, the fields of the authorized access page may return to their previous settings, e.g., values, labels, system logic, etc.

In other approaches, an authorized access page may require the correct answer to a presented question before modification of any field(s) of the authorized access page is permitted and/or processed. In other words, a question may be presented on the "front-end" of an authorized access page. Moreover, if a received response to the presented question does not include the correct answer, a different question may be presented, as will be described in detail below.

Regardless of the point at which a question is presented in relation to a modification to one or more fields of an authorized access page, the application of the modification is preferably only permitted when the response to the question includes a correct response (answer) to the question. Depending on the type and/or subject matter of the question presented, e.g., to a user, there may be a single correct response, two correct responses, multiple correct responses, etc. According to an example, which is in no way intended to limit the invention, a question presented to a user may prompt the user to enter the storage size of a system associated with the authorized access page. If the storage size of the illustrative system is 500.56 Terabytes (TB), correct responses to the question presented asking for the storage size of a system may include 500.56 TB, 500.5 TB or 500 TB, e.g., depending on the desired accuracy of the answer to the presented question. Moreover, in other approaches, correct answers for the present example may include 500.56 TB, $5.0056*10^8$ MB, 0.50056 PB, etc., depending on the desired embodiment.

Presented questions including a characteristic of the device and/or system (also referred to herein as "characteristic questions") may serve to be beneficial because it is unlikely that a spider, smart spider, security audit/scan, unauthorized user, etc. would know or be able to guess the correct answer to such characteristic questions. For example, a characteristic question may prompt a user to enter the storage size of the device and/or system being accessed which may be readily apparent and/or easily accessible to an authorized user of the device and/or system, but may be effectively impossible for an unauthorized user to guess. It follows that an authorized user would not need to memorize a unique security password, because the authorized user would be familiar with the characteristic question answer(s) and/or would have access to the answers. Therefore, characteristic questions desirably provide a non-user specific security measure for accessing and/or modifying an authorized access page.

As mentioned above, an authorized user may have access to the answer(s) of characteristic questions. For example, the characteristic of the device and/or system may be obtainable by a user of the device and/or system by inspection of the device and/or system, e.g., by viewing the physical system, accessing a computer generated page showing the characteristic, having an understanding of the question subject matter already, etc. In the event that a user does not know the answer to a particular question, they may navigate the storage product to find the answer, and afterwards return to and complete the characteristic question.

As previously mentioned, if the response to a presented question does not include a correct response, a different question may be provided. The correct response (answer) to the different question is preferably different than that of the originally presented question, but is not limited thereto. Thus, according to some approaches, the answer to the different question may include a different characteristic of the device and/or system than the answer to the initial question.

In some approaches, an administrator for the device and/or system may also set a limit on the number of page-delivered questions a user may answer incorrectly before further action is taken. For example, an administrator may determine a limit of incorrect answers before the user is locked out from accessing the authorized access page for a predetermined period of time, the user is not presented an additional question to answer, the administrator is alerted of suspicious activity, the device and/or system is placed on lockdown, etc. In the event that a spider, smart spider, security audit and/or scan, unauthorized user, etc. were attempting to gain unauthorized access to a device and/or system, such approaches may further secure the device and/or system. However, in other approaches, a limit on the number of page delivered questions a user may answer incorrectly before further action is taken may be predefined, determined by a lookup table, randomly generated, etc., depending on the desired embodiment.

An illustrative embodiment includes a spider/web crawler traversing through the device and/or system, clicking on every text box, option, menu, etc. that is comes across. When it attempts to access the system master reset portion of the system and/or device, it is presented with a characteristic question as described above, which is non-user specific and has been generated based on some characteristic of the system and/or device. The spider does not understand what the question is and enters a text blurb into the text box provided and clicks enter. The spider's answer includes an incorrect response. The system then provides the spider with an additional question, and upon repeating this sequence five times, the device and/or system is placed on lockdown, and the administrator is alerted of repeated potentially suspicious access requests. The spider was denied access to the device and/or system.

Figure 4:
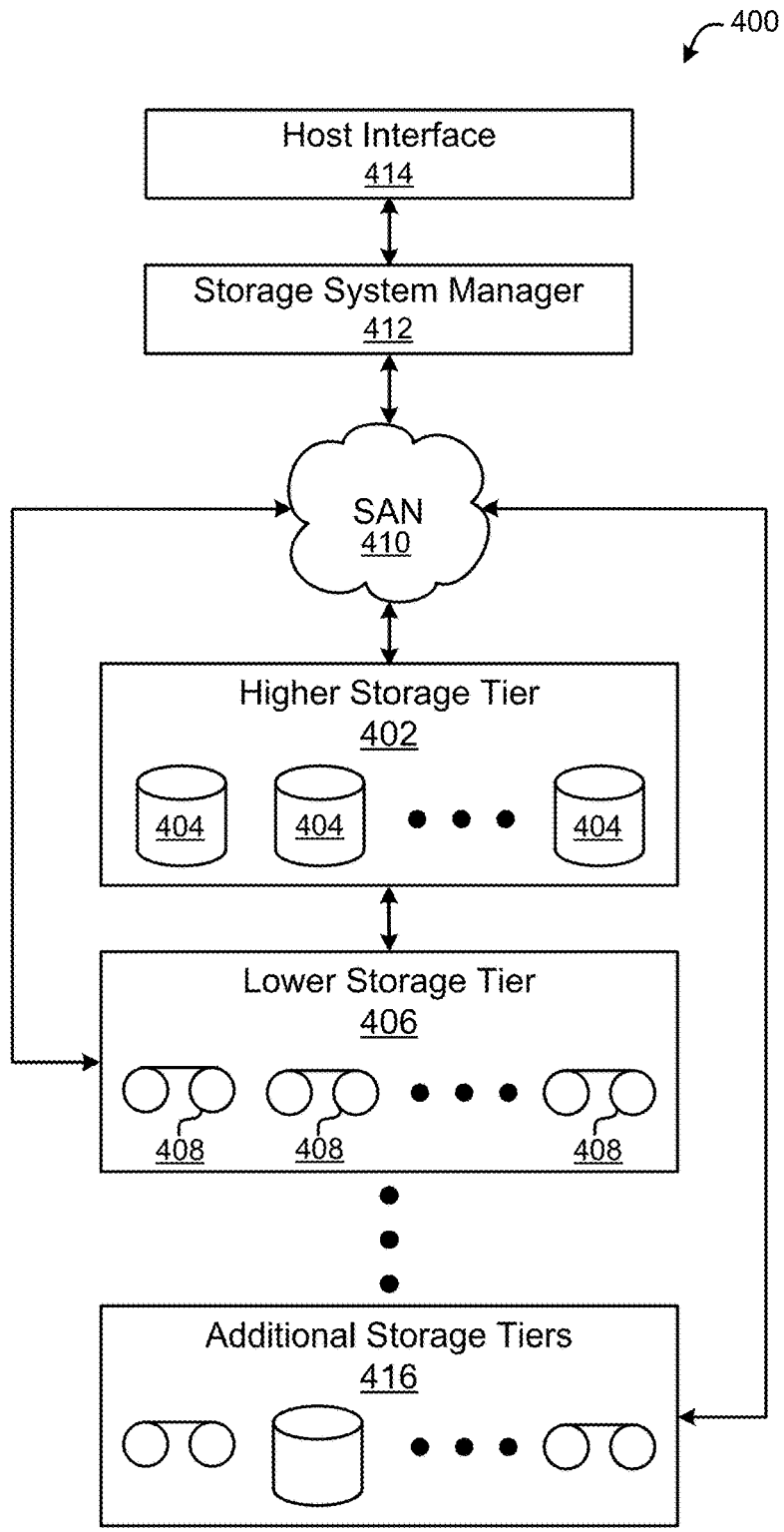
FIG. 4 illustrates a tiered data storage system in accordance with one embodiment.

Now referring to FIG. 4, a storage system 400 is shown to provide a working example according to one exemplary embodiment. Note that some of the elements shown in FIG. 4 may be implemented as hardware and/or software, according to various embodiments. The storage system 400 may include a storage system manager 412 for communicating with a plurality of media on a higher storage tier 402 and a lower storage tier 406. The higher storage tier 402 preferably may include one or more random access and/or direct access media 404, such as hard disks in hard disk drives (HDDs), nonvolatile memory (NVM), solid state memory in solid state drives (SSDs), etc., and/or others noted herein. The lower storage tier 406 may preferably include one or more sequential access media 408, such as magnetic tape in tape drives, optical media, etc., and/or others noted herein. Additional storage tiers 416 may include any combination of storage memory media. The storage system manager 412 may communicate with the storage media 404, 408 on the higher and lower storage tiers 402, 406 through a network 410, such as a storage area network (SAN), as shown in FIG. 4. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic adapted to receive a request to open a data set, logic adapted to determine if the requested data set is stored to a lower storage tier 406 of a tiered data storage system 400 in multiple associated portions, logic adapted to move each associated portion of the requested data set to a higher storage tier 402 of the tiered data storage system 400, and logic adapted to assemble the requested data set on the higher storage tier 402 of the tiered data storage system 400 from the associated portions. Of course, this logic may be implemented as a method on any device and/or system or as a computer program product, according to various embodiments.

Components of system 400 may be secured by authorized access pages as described above. Therefore operation steps of method 300 may be implemented in accordance with the components of system 400.

During a security audit of the system 400, spiders may be sent to traverse various layers of the system to probe for security flaws, operational flaws, etc. For any content that should not be modified by a spider, a question of a type described above may be presented. Illustrative questions may include details about any of the components of the system, e.g., as described above.

For example, in the event that a computerized automation such as spider program was traversing network 410, and attempting to gain access to higher storage tier 402, the computer automation may be presented with a characteristic questions of the system 400. For example, the question may ask for the number of storage media 404 contained in the higher storage tier 402. The computerized automation would not know the answer to such a characteristic question and/or the correct answer to the presented question, and therefore would be unable to gain access to the secured higher storage tier 402. Furthermore, an authorized user would know or be able to easily find out the number of storage media 404 in the higher storage tier 402, and be granted access to the higher storage tier 402 upon providing the correct answer to the asked characteristic question.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for preventing unauthorized access to and/or modification of a page of a device and/or system, the method comprising:
   presenting a question via a graphical user interface, wherein an answer to the question includes a characteristic of the device and/or system;
   receiving a response to the question;
   allowing access to and/or modification of the page in response to determining that the response to the question includes the answer;
   not allowing access to and/or modification of the page in response to determining that the response to the question does not include the answer; and
   providing a different question in response to determining that the response to the question does not include the answer, wherein an answer to the different question includes a different characteristic of the device and/or system.

2. The method of claim 1, wherein the characteristic of the device and/or system is a physical characteristic.

3. The method of claim 1, wherein the characteristic of the device and/or system is obtainable to a user of the device and/or system by inspection of the device and/or system, wherein the response to the question is received from a user viewing the graphical user interface.

4. The method of claim 1, comprising generating the question in response to an access and/or modification request for the page.

5. The method of claim 1, wherein the system is a data storage system.

6. The method of claim 1, wherein the characteristic is ascertainable by visually inspecting the device and/or system, the page including a collection of data about the device and/or system.

7. The method of claim 1, wherein the method is performed during a security audit.

8. The method of claim 1, wherein the characteristic is ascertainable by visually inspecting the device and/or system, the page including a collection of data about the device and/or system.

9. A computer program product for preventing unauthorized access to and/or modification of a page of a device and/or system, the computer program product comprising a computer readable storage medium having program code embodied therewith, wherein the computer readable storage medium is not a transitory signal per se the program code readable and/or executable by a processor to cause the processor to:

present a question via a graphical user interface, wherein an answer to the question includes a characteristic of the device and/or system;

receive a response to the question;

allow access to and/or modification of the page in response to determining that the response to the question includes the answer; and not allow access to and/or modification of the page in response to determining that the response to the question does not include the answer, wherein modification of a field on the page is permitted while the page is being output, wherein application of the modification is only permitted when the response to the question includes the answer.

10. The computer program product of claim 9, wherein the characteristic of the device and/or system is a physical characteristic.

11. The computer program product of claim 9, wherein the characteristic of the device and/or system is obtainable to a user of the device and/or system by inspection of the device and/or system.

12. The computer program product of claim 9, wherein the characteristic is ascertainable by visually inspecting the device and/or system, the page including a collection of data about the device and/or system.

13. The computer program product of claim 9, wherein the program code readable and/or executable by the processor further causes the processor to: generate the question in response to an access and/or modification request for the page.

14. The computer program product of claim 9, wherein the system is a data storage system.

15. The computer program product of claim 9, wherein the computer program product is performed during a security audit.

16. A system, comprising:
a processor and logic integrated with and/or executable by the processor, the logic being configured to:
present a question via a graphical user interface, wherein an answer to the question includes a characteristic of a device and/or system;
receive a response to the question;
allow access to and/or modification of a page when the response to the question includes the answer;
not allow access to and/or modification of the page when the response to the question does not include the answer; and
provide a different question when the response to the question does not include the answer, wherein an answer to the different question includes a different physical characteristic of the device and/or system.

17. The system of claim 16, the different physical characteristic being ascertainable by visually inspecting the device and/or system, the page including a collection of data about the device and/or system.

18. The system of claim 16, wherein modification of a field on the page is permitted while the page is being output, wherein application of the modification is only permitted when the response to the question includes the answer.

* * * * *